No. 824,062. PATENTED JUNE 19, 1906.
J. W. BRAGSTAD.
CLUTCH MECHANISM FOR DISPLAY DEVICES.
APPLICATION FILED AUG. 22, 1905.
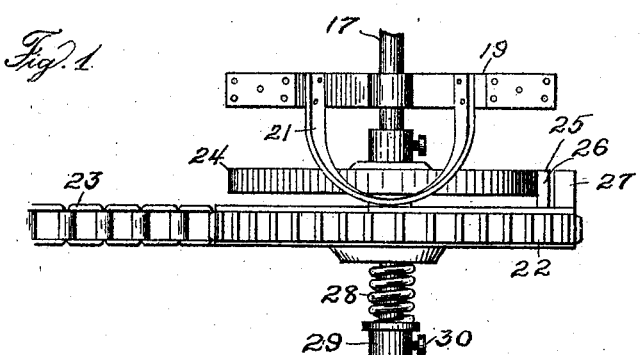
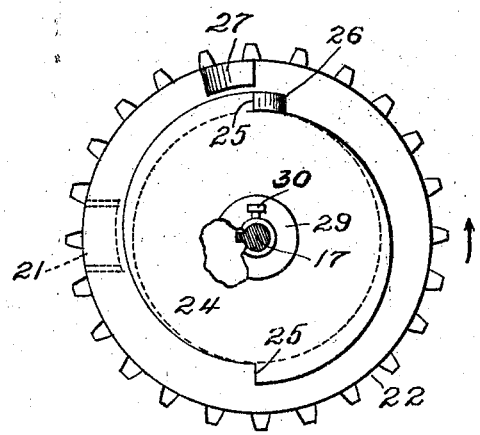
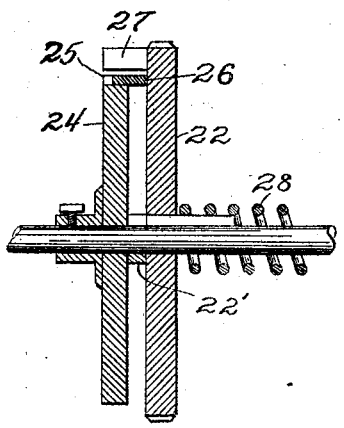
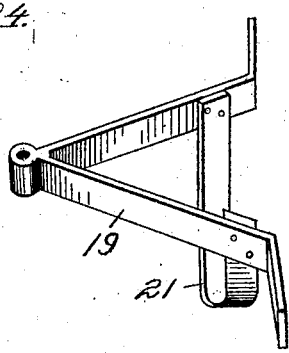
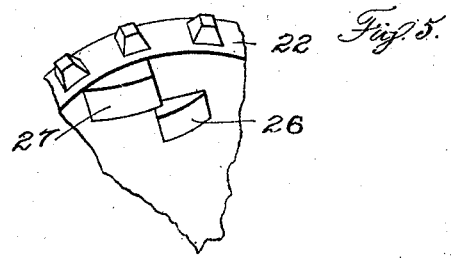
Witnesses:
A. H. Ratsag,
A. J. Trigg.
Inventor:
J. W. Bragstad,
by H. C. Evert & Co.
Attorneys

UNITED STATES PATENT OFFICE.

JOSEPH W. BRAGSTAD, OF HURON, SOUTH DAKOTA.

CLUTCH MECHANISM FOR DISPLAY DEVICES.

No. 824,062.  Specification of Letters Patent.  Patented June 19, 1906.

Application filed August 22, 1905. Serial No. 275,248.

*To all whom it may concern:*

Be it known that I, JOSEPH W. BRAGSTAD, a citizen of the United States of America, residing at Huron, in the county of Beadle and State of South Dakota, have invented certain new and useful Improvements in Clutch Mechanism for Display Devices, of which the following is a specification, reference being had therein to the accompanying drawings.

This invention relates to certain new and useful improvements in clutch mechanism for window-display devices and as applied to that use primarily embodies an apparatus for operating an endless display-carrier wherein the motion of the carrier shall be intermittent and in the same direction of travel. The mechanism is so constructed and arranged that the display-carrier shall travel for a certain period of time and shall be at rest for an equal period, the traveling and stopping operations of course occurring alternately.

The invention relates more to a novel form of power transmission for the display-carrier than to the carrier *per se.*

In the preferred embodiment of the invention the construction comprises a gear-train connected with a drive-shaft by a clutch mechanism and provided with devices for throwing the gear-train alternately into and out of engagement with the clutch mechanism during predetermined intervals of time in the travel of the master drive-wheel irrespective of the form of drive-wheel employed.

The detailed construction will appear in the course of the following description, in which reference is had to the accompanying drawings, forming a part of this specification, like numerals designating like parts throughout the several views, wherein—

Figure 1 is a plan view illustrating a novel form of clutch mechanism. Fig. 2 is a view of the master drive-wheel, which is shown as a sprocket, and the clutch-wheel adapted to be engaged and operated thereby. Fig. 3 is a sectional view of the intermittent power devices shown in Fig. 2. Fig. 4 is a perspective view of a bracket for supporting the drive-shaft and which is provided with an arch-shaped arm that coacts with the master drive-wheel to throw the latter out of engagement with the clutch-wheel, and Fig. 5 is an enlarged perspective view of a portion of the master drive-wheel shown in elevation in Fig. 2.

The main shaft of my mechanism, and which will be hereinafter called the "drive-shaft," is designated 17 in the drawings. The shaft 17 is supported upon brackets 19 and 20, which are secured to a suitable support provided therefor. These brackets are of similar construction in themselves; but it is to be noted that the inner bracket 19 is provided adjacent its face with an arc-shaped arm 21, which presents a cam-surface. The function and purpose of the arm 21 will be hereinafter described. The shaft 17 is driven through the medium of a drive-wheel 22 during the periods of time when the latter is in engagement with the clutch-wheel 24, to be more fully described. The wheel 22 is driven by a sprocket-chain 23, receiving motion from any suitable source. The sprocket-wheel 22 is loosely mounted upon the shaft 17 and is capable of a lateral sliding motion upon said shaft in its engagement with and disengagement from the clutch-wheel. Adjacent the said drive-wheel 22 a wheel 24 is rigidly mounted upon the shaft 17, which owing to its function I designate a "clutch-wheel." The wheel 24 is formed with a pair of shoulders 25, extending gradually from the periphery thereof, as is shown in dotted lines in Fig. 2. These shoulders are arranged in diametrically opposite relation and extend also in opposite directions. The wheel 22 is formed on its inner face with an abutment 26, adapted for engagement with the shoulders 25 of the clutch-wheel 24. The abutment 26 is arranged the same distance from the shaft 17 as the periphery of the wheel 24, so that said abutment in the travel of the wheel 22 will lie directly in the path of the shoulders 25. Arranged adjacent the periphery of the wheel 22, and on the inner face thereof, I provide a second abutment 27, which is formed with a cam-face and is disposed adjacent the abutment 26, the cam-surface of the abutment 27 extending some distance on the opposite side of the abutment 26.

To normally retain the wheel 22 in its position adjacent the wheel 24, but spaced therefrom by an annular centrally-disposed flange 22', I provide an expansive spring 28, interposed between the outer surface of the wheel 22 and an adjustably-movable collar 29, held rigid upon the shaft 17 by set-screw 30.

The operation is as follows: Assuming that the sprocket 22 is connected with a motor by the chain 23, said sprocket, as shown in the drawings, will revolve in the direction of the arrow in Fig. 2—that is, to the left. The abutment 26, carried thereby, will engage the shoulders 25 of the clutch-wheel 24, thereby rotating the latter with the sprocket 22 and moving the mechanism connected with the shaft 17. The clutch-wheel 24 will move with the wheel 22, owing to the engagement of the abutment 26 and the shoulder 25, until the cam-faced abutment 27 on said wheel 22 comes adjacent the cam-faced arm 21 of the supporting-bracket 19, at which time the abutment 27 will engage with its cam-face the arm 21, the latter by virtue of its engagement with the abutment 27 then moving said wheel outwardly, and thereby disengaging the abutment 26 from the shoulder 25, the wheel 22 the while revolving independently of the clutch-wheel 24 and the shaft 17 until the abutment 27 has cleared the cam-faced arm 21, at which time the expansive spring 28 will force the sprocket 22 inwardly, and the abutment 26 at the completion of a semi-revolution of the sprocket 22 will engage the next adjacent shoulder 25 and move the clutch-wheel 24 a semirevolution until the abutment 27 again engages the arm 21, at which time the operation above described will be repeated, and so on indefinitely. Thus the movement of the mechanism connected with shaft 17 will be dependent upon the intervals of engagement and disengagement of the wheels 22 and 24. It is obvious that by increasing the number of shoulders 26 and by correspondingly increasing the number of cam-arms 21 the time between the disengagement and engagement of the two wheels can be shortened in proportion, and hence the intervals of travel and rest of the shaft 17 will be increased.

Having fully described my invention claim—

1. The combination with a drive-shaft, of a drive-wheel rigidly mounted upon said shaft and formed with a clutch-face, a power-transmission wheel formed with a clutch-face corresponding to the clutch-face upon said drive-wheel, said power-transmission wheel being movable in the direction of the length of the said shaft, brackets for supporting said shaft and an extension carried by one of said brackets, an extension carried by said power-transmission wheel adapted to engage said first-named extension at regular intervals during the rotary movement of said transmission-wheel, whereby to disengage said transmission-wheel from said drive-wheel and means for returning said power-transmission wheel into engagement with said drive-wheel after each disengagement therefrom.

2. A power-transmission gearing embodying in combination with a drive-shaft, a drive-wheel rigidly mounted upon said shaft and formed with a clutch-face, a power-transmission wheel loosely mounted upon said shaft, power-transmission means connected to said power-transmission wheel, said power-transmission wheel being formed with a clutch-face corresponding to the clutch-face on said drive-wheel, means for supporting said shaft, a cam-faced member carried by said supporting means, a cam-faced extension carried by said power-transmission wheel adapted to engage said cam-faced member at intervals during the rotatory movement of said wheel whereby to disengage the same from the drive-wheel and a spring for returning said power-transmission wheel into engagement with the drive-wheel after each disengagement thereof.

3. A power-transmission gearing embodying in combination with a drive-shaft, a drive-wheel rigidly mounted upon said shaft and being formed with a clutch-face, a power-transmission wheel loosely mounted upon said drive-shaft, said power-transmission wheel being formed with a corresponding clutch-face whereby to engage said drive-wheel, brackets for supporting said shaft, an arc-shaped arm carried by one of said brackets, a cam-faced extension carried by said transmission-wheel adapted to engage said arc-shaped arm at regular intervals during the rotatory movement of said transmission-wheel whereby to disengage the same from the drive-wheel, and adjustable means for returning said power-transmission wheel into engagement with the drive-wheel after each disengagement thereof.

In testimony whereof I affix my signature in the presence of two witnesses.

JOSEPH W. BRAGSTAD.

Witnesses:
A. A. CHAMBERLAIN,
W. W. FARMER.